US011693845B2

(12) United States Patent
Abraham (10) Patent No.: US 11,693,845 B2
(45) Date of Patent: Jul. 4, 2023

(54) SYSTEM AND METHOD FOR EVENT-BASED DATA ACQUISITION IN REAL-TIME APPLICATIONS

(71) Applicant: Onapsis, Inc., Boston, MA (US)

(72) Inventor: Sergio Abraham, Ciudad de Buenos Aires (AR)

(73) Assignee: Onapsis, Inc., Boston, MA (US)

( * ) Notice: Subject to any disclaimer, the term of this patent is extended or adjusted under 35 U.S.C. 154(b) by 331 days.

(21) Appl. No.: 15/463,192

(22) Filed: Mar. 20, 2017

(65) Prior Publication Data

US 2018/0268018 A1 Sep. 20, 2018

(51) Int. Cl.
G06F 16/23 (2019.01)
H04L 65/65 (2022.01)
H04L 65/70 (2022.01)

(52) U.S. Cl.
CPC .......... *G06F 16/2365* (2019.01); *H04L 65/65* (2022.05); *H04L 65/70* (2022.05)

(58) Field of Classification Search
CPC .. G06F 21/31; G06F 21/35; G06F 2221/2111; G06F 16/2365; G06F 17/246; G06F 16/2477; G06F 16/24578; G06F 16/447; G06F 16/743; G06F 2201/86; H04L 65/607; H04L 65/608
See application file for complete search history.

(56) References Cited

U.S. PATENT DOCUMENTS

| | | | |
|---|---|---|---|
| 9,710,308 B1 * | 7/2017 | Schwartz | G06F 9/4881 |
| 2005/0209876 A1 * | 9/2005 | Kennis | G06Q 10/06 726/1 |
| 2005/0235145 A1 * | 10/2005 | Slick | H04L 63/0428 713/165 |
| 2013/0275385 A1 * | 10/2013 | Chan | G06F 16/113 707/667 |
| 2013/0290360 A1 * | 10/2013 | Cunningham | G06F 16/211 707/758 |
| 2013/0298192 A1 * | 11/2013 | Kumar | G06F 21/52 726/3 |
| 2017/0126794 A1 * | 5/2017 | Khadiwala | G06F 3/061 |

OTHER PUBLICATIONS

Emiliano Kargieman and Ariel Futoransky; VCR and PEO revised; Oct. 1998.
Bruce Schneier and John Kelsey; Secure Audit Logs to Support Computer Forensics; Jan. 1998.
European Search Report for EP 18162802.5, dated Jul. 24, 2018.

* cited by examiner

*Primary Examiner* — Amresh Singh
*Assistant Examiner* — Fatima P Mina
(74) *Attorney, Agent, or Firm* — Crowell & Moring LLP (57) ABSTRACT

A system for acquiring time limited data to facilitate integrity verification in real-time applications (RTAs) includes an agent and a collector. The agent is associated with a RTA and is in communication with the collector. The agent defines a plurality of time ordered time frames and during each time frame collects a collection of events from event sources occurring on the RTA. The agent calculates a local integrity check from the collection and a previous integrity check or an initial key, and transmits a global integrity check calculated from local integrity checks to the collector. The collector receives the global integrity check from the agent and stores the received global integrity check in a secure storage. The collector validates the integrity of the global integrity check and the received collections of events.

24 Claims, 10 Drawing Sheets

SYSTEM AND METHOD FOR EVENT-BASED DATA ACQUISITION IN REAL-TIME APPLICATIONS

FIELD OF THE INVENTION

The present invention relates to system forensics analysis (also known as digital forensics or computer forensics), and more particularly, is related to proactively acquiring data in real-time applications.

BACKGROUND OF THE INVENTION

Some proceedings or analyses involve or utilize data collected by or extracted from one or more computer based real-time applications (RTA), for example, web servers, application servers, database servers, operating systems and/or business critical applications (BCAs), among others. Examples of BCAs include, but are not limited to Enterprise Resource Planning (ERP), Customer Relationship Management (CRM), Supplier Relationship Management (SRM), Supply Chain Management (SCM), Product Life-cycle Management (PLM), Human Capital Management (HCM), Integration Platforms, Business Warehouse (BW)/Business Intelligence (BI) and Integration applications developed by SAP, Oracle, Microsoft, Siebel, J D Edwards and PeopleSoft. While it is noted that such proceedings or analyses are in no way limited to evidence gathering, looking at an example of forensics analysis where the collected/extracted data may be used as evidence, the data collected by previous systems has not shown when and how specific data became available (e.g., was received or derived) by the RTA. This may be important, for example, for proving chain of custody (CoC) of certain information used by and/or stored by the RTA. Examples of other such proceedings include, but are not limited to, compliance testing and/or verification of RTAs, internal/external controls verification, audit processes such as SOX audits, PCI audits, and other standards.

When high use computer based systems are subjected to data collection/extraction such as, for example, in forensics analysis, the traditional way of extracting evidence and checking its integrity is not feasible for RTAs. The traditional chain of custody for data collected from computer systems is not applicable for RTAs. For RTAs, the evidence identification and acquisition (first step of CoC) and the characteristics such evidence must comply with has not been achieved for RTAs in the same manner as for more simple services or computers. For instance, the first step of a forensics process is often related to imaging and data handling. As RTAs such as BCAs are usually huge systems that cannot be shut down, these types of processes may be impracticable.

Currently, extracting data from an RTA is performed without shutting down the system, without a user of the system being aware of altering the behavior of the system, and without modifying the data itself.

While current data acquisition practices are internationally accepted, they only warranty a snapshot of the moment when the data was extracted. However, in certain circumstances it is necessary, or desirable, to have data extraction repeatable and reproducible. For example, according to NIST (National Institute of Standards and Technology), the results of a digital forensics procedure must be repeatable and reproducible to be considered admissible as electronic evidence. Repeatability means that the same results should be obtained when performing the same procedure within short intervals of time; reproducibility means that the same results should be obtained when performing the same procedure in different facilities; and, time limited means that the evidence may be attributable to an identifiable, defined period of time. It should be noted that as per the Detailed Description section, the definitions of these terms as used within this disclosure may be broader than the NIST definitions.

Figure 1:
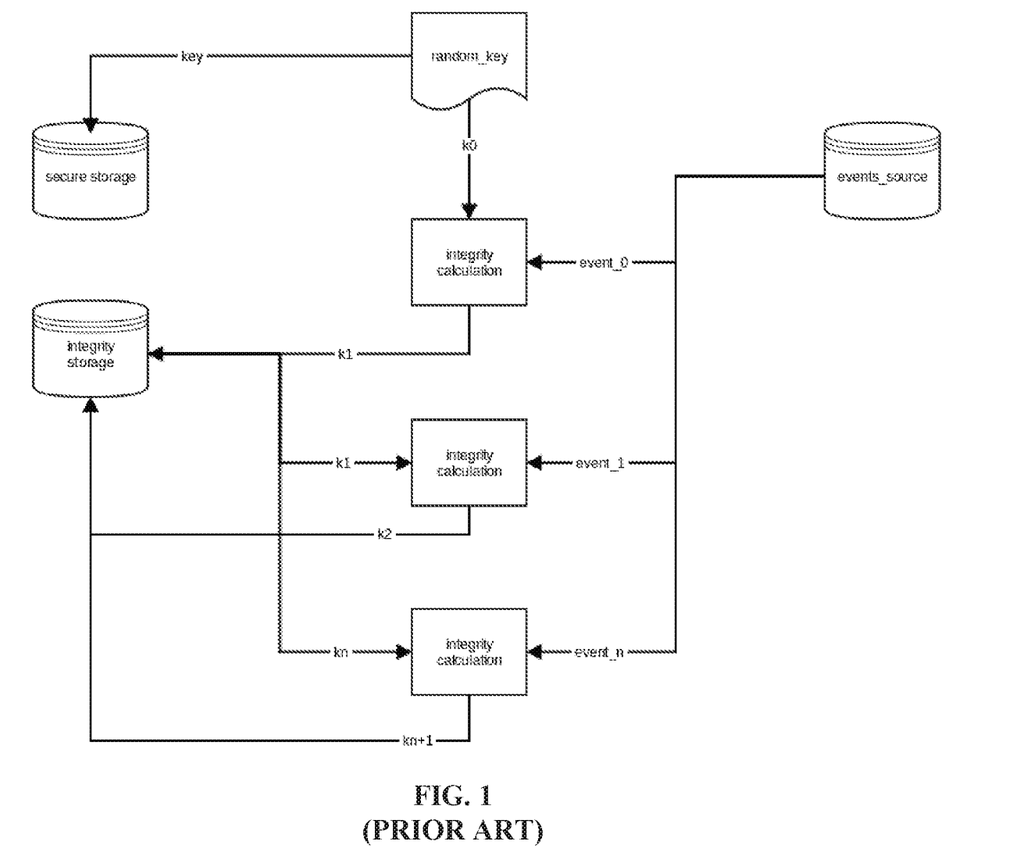
FIG. 1 is a schematic diagram of a prior art system for data extraction.

Since an RTA such as a BCA is constantly being heavily used, information within the BCA is modified at every moment, so every elapsed second may represent thousands of changes in the information. As a consequence, the data acquired using current methods from RTAs is neither repeatable nor reproducible. Further, previous systems and methods support the integrity for evidence acquisition in only one events source which, while possibly useful in certain scenarios, may not be scalable to systems with multiple sources of information. A description of this type of evidence acquisition has been described, for example, by Bruce Schneier and John Kelsey ("Secure Audit Logs to Support Computer Forensics," January 1998), and Emiliano Kargieman and Ariel Futoransky ("VCR and PEO revised", October 1998). These mechanisms are generally event based, such that an integrity calculation is calculated per event, as shown by FIG. 1. Such systems may work in concert with a security audit log file, including static organizational data that must be constantly updated. In addition, both mechanisms depend upon not leaking the integrity check, thereby implementing forward secrecy. In practice, however, the integrity of the events is unenforceable if the integrity check (hash) is compromised.

An integrity check for each subsequent event is calculated using the current event and the previous integrity check k. Integrity checks are stored in integrity storage, for example, a hard drive. An initial random key $k_0$ is stored in secure storage, and used for the first integrity calculation. An events source produces multiple events, so n integrity checks $k_1$, $k_2$, $k_n$, $k_{0+1}$ are performed as a result of the occurrence of n events event_0, event_1, . . . , event n. Each integrity check k is calculated per event, independently of when each event occurred. Consecutive integrity checks are chained together to calculate a single check for all of them. If the integrity check is compromised, the integrity of the system cannot be ensured. Further, since there is no time reference, the system check is time dependent, and changes over time as additional events occur, there is no way to reconstruct the integrity check at a specified moment in time. Therefore, there is a need in the industry to address one or more of these shortcomings.

SUMMARY OF THE INVENTION

Embodiments of the present invention provide a system and method for events-based acquisition of time limited data to facilitate integrity verification in real-time applications (RTAs). Briefly described, the present invention is directed to a system for data acquisition from real-time applications (RTAs) including an agent and a collector. The agent is associated with an RTA and is in communication with the collector. The agent defines a plurality of time ordered time frames and during each time frame collects a collection of events from event sources occurring on the RTA. The agent calculates a local integrity check from the collection of events and a previous integrity check or an initial key, and transmits a global integrity check calculated from local integrity checks to the collector. The collector receives the global integrity check from the agent and stores the received global integrity check in a secure storage.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

The following definitions are useful for interpreting terms applied to features of the embodiments disclosed herein, and are meant only to define elements within the disclosure.

As used within this disclosure, a "time frame" is a period of time having a defined duration (otherwise known as a "time window") where events may be collected by an agent from an RTA. A time frame may have a duration ranging from, for example, on the order of one or more seconds, to several minutes or more. Different time frames, for example, two different time frames configured by the user in the same agent, may have different durations. For example, time frames may be relatively short during times of high RTA activity, and relatively long during times of low RTA activity (for instance, outside of normal business operating hours).

As used within this disclosure, a "source" is an addressable storage/memory location within an RTA where one or more events may reside. For example, a source may include a database table, a plain-text file, or any other form of data format stored in persistent memory. An event refers to an instance of one or more instances of data within a source being changed: added, deleted, or altered.

As used within this disclosure, "local" refers to data, an event, or an operation occurring at a single collection, for example, a local integrity check refers to an integrity check performed at a collection of on data/events of one time frame. In contrast, "global" refers to data, an event, or an operation involving two or more collections. For example, a global integrity check refers to an integrity check based on collections of data/events of more than one time frame.

As used within this specification, a "business-critical application" (BCA) generally refers to a crucial application to keeping the business running. These types of applications can vary from small tools to company-wide systems. These applications can work on clients' servers, be provided by third parties, or can be developed internally. Generally speaking, these are critical applications that if interrupted, the interruption could result in financial losses, legal losses, negative publicity for the company, unhappy employees or customers, etc. A BCA may be totally different in different companies or different industries; depending on which system(s) could cause significant damage to a company if problems occur. Exemplary BCAs include, for example, an enterprise resource planning (ERP) system of a retail company, a Business Intelligence system of a marketing company, or an HR system of a Human Resources Consultant. Other examples of a business critical application include an airline reservation system or a transaction process system for a bank. Examples of vendors of Business Critical Applications include SAP® and Oracle® with their huge variety of products, as well as others listed in the Background section.

As used within this disclosure, "data integrity verification" refers to the validation of integrity of data/information collected from a real-time computer based system during acquisition of the data/information, as an example, for evidence in legal proceedings.

As used within this disclosure, "evidence" is an example of verifiable results of a data acquisition procedure, for example but not limited to, a digital forensics procedure. The data acquisition procedure results may be verifiable if the results are demonstrably not corrupt, for example, if the results are repeatable, reproducible, and/or admissible as electronic evidence. An example of repeatability is that the same results may be obtained when performing the same procedure at two different times. An example of reproducibility is that the same results may be obtained when performing the same procedure in facilities, for example, in different locations, using the same or different devices or systems hosting the RTA. "Time limited" means attributable to an identifiable, closed, defined period of time. An example of evidence includes reproducible time limited data integrity verification in real-time applications. While "evidence" indicates the collected information may meet a standard for admissibility in a legal procedure, the use of the term "evidence" does not restrict the embodiments described herein to only being used for legal procedures. Indeed, the embodiments may be useful in other scenarios, for example, compliance testing/verification.

Reference will now be made in detail to embodiments of the present invention, examples of which are illustrated in the accompanying drawings. Wherever possible, the same reference numbers are used in the drawings and the description to refer to the same or like parts.

As described in the Background section, RTAs such as BCAs may operate in environments where associated servers subject to data integrity analysis, such as, but not limited to, forensic analysis, are highly critical or are a part of a critical process within a business. Due to their criticality, those systems cannot be turned off or removed from their process. Additionally, these systems may constantly modify the sources of information. Therefore, for example, these systems cannot be subject to a traditional forensics procedure with legal proceedings since the evidence would not be admissible, as it is not repeatable and/or reproducible. Exemplary embodiments of the present invention provide, but are not limited to systems and methods enabling Business Critical Applications to be part of a Chain of Custody process used for legal proceedings.

While part of the following description of the present system and method provides for use within an exemplary environment to enable BCAs to be part of a Chain of Custody process used for legal proceedings, it is noted that this example is merely provided for exemplary purposes and the present invention is in no way intended to be limited to use in enabling BCAs to be part of a Chain of Custody process used for legal proceedings. Instead, the present system and method may be used in one or more other environments.

As discussed above in the Background section, previous approaches for acquiring verifiable data such as evidence from RTAs, such as BCAs, extract the information by checking the integrity of complete files or tables (sources). As RTAs may constantly modify these sources of information, a source (file) integrity check only produces evidence relevant to a time snapshot of the constantly shifting information context contained in the system at the instant in time when the extraction occurs, and therefore may not be repeatable and/or reproducible.

In general, embodiments of the present invention calculate integrity checks in real time and without powering down an associated system by collecting event based information based on time, instead of being solely based upon the source of the event. Instead, the embodiments collect verifiable results of a data acquisition consisting of events from a specific period of time and calculate a local integrity check for that period of time based on the previously generated checks, for example, in a chain-based approach. As a result, embodiments of the present invention allow an auditor/consultant to pick a specific arbitrary time and calculate a global integrity check for that time. Therefore, the evidence becomes repeatable and reproducible.

Where the prior art system shown in FIG. 1 performs integrity calculations for each event without a time reference, under the present embodiments the integrity of the sources is calculated with respect to a time frame. A global integrity may be calculated by chaining the integrity values of different time frames, using a different mechanism, described further below.

For the system of FIG. 1, each time a new event occurs, the integrity check may be calculated. In the embodiments described herein, all the events occurring within a time frame may be collected, and an integrity check may be calculated for all the events occurring during that time frame at the end of the time frame.

Figure 2:
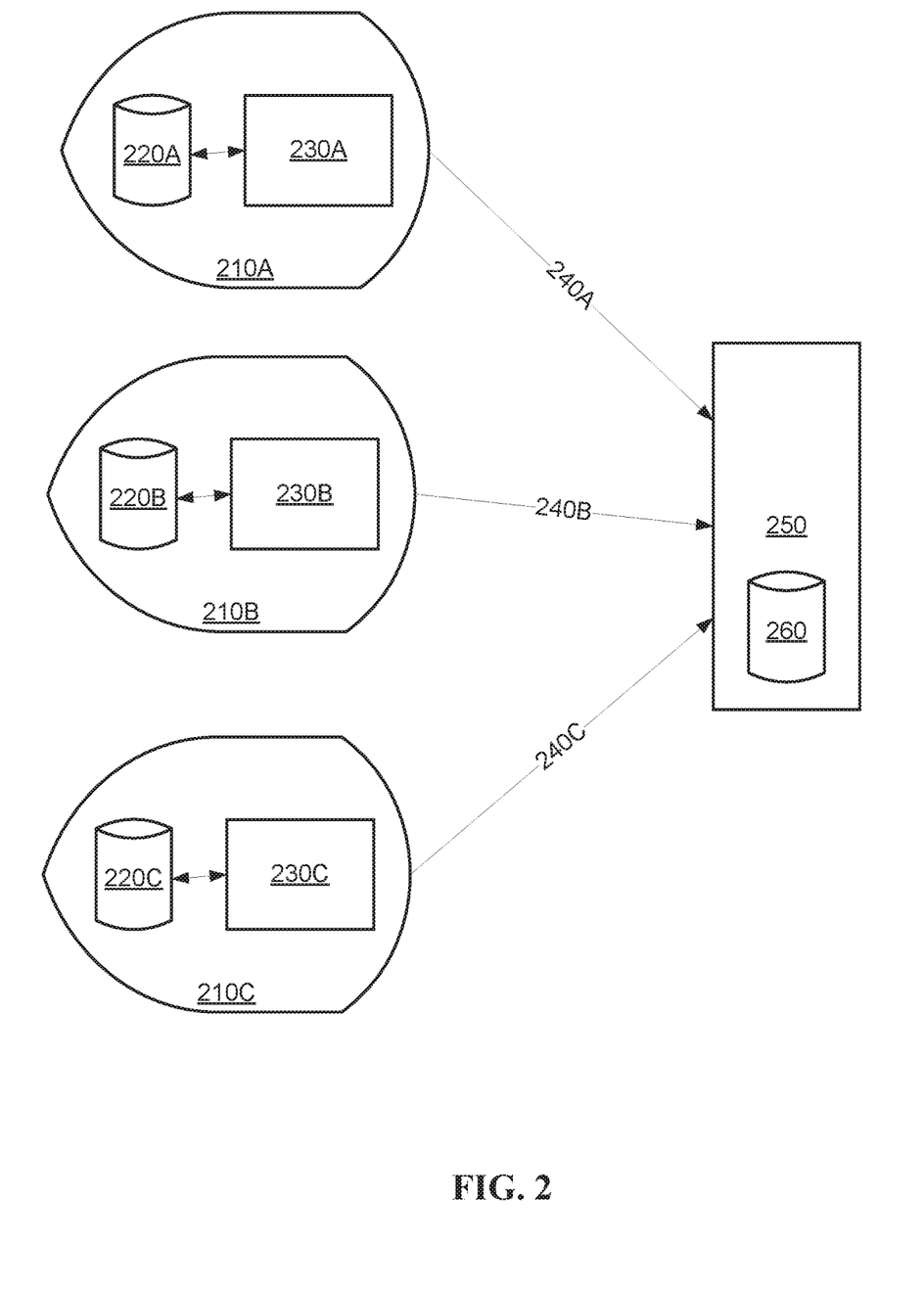
FIG. 2 is a schematic diagram of an exemplary first embodiment of a system for extracting data from a business-critical application in a repeatable and reproducible manner.

FIG. 2 is a schematic diagram of an exemplary first embodiment of a system for extracting evidence from an RTA 210A, 210B, 210C. Each RTA 210A, 210B, 210C includes a memory 220A, 220B, 220C and an agent 230A, 230B, 230C. One or more of the agents 230A, 230B, 230C may be implemented as a process running within the RTA 210A, 210B, 210C, and/or may be implemented as a process running on a processor (not shown) in a processing device separate from the RTA 210A, 210B, 210C and in communication with the RTA 210A, 210B, 210C.

The agent 230A, 230B, 230C is in communication with a collector 250, for example, via a data network such as a wired or wireless local area network (LAN) or a wide area network (WAN). The agents 230A, 230B, 230C may all be within the same LAN, or may be distributed across two or more data networks. The agents 230A, 230B, 230C may be configured to convey information 240A, 240B, 240C via the network to the collector 250 periodically or non-periodically.

Figure 3:
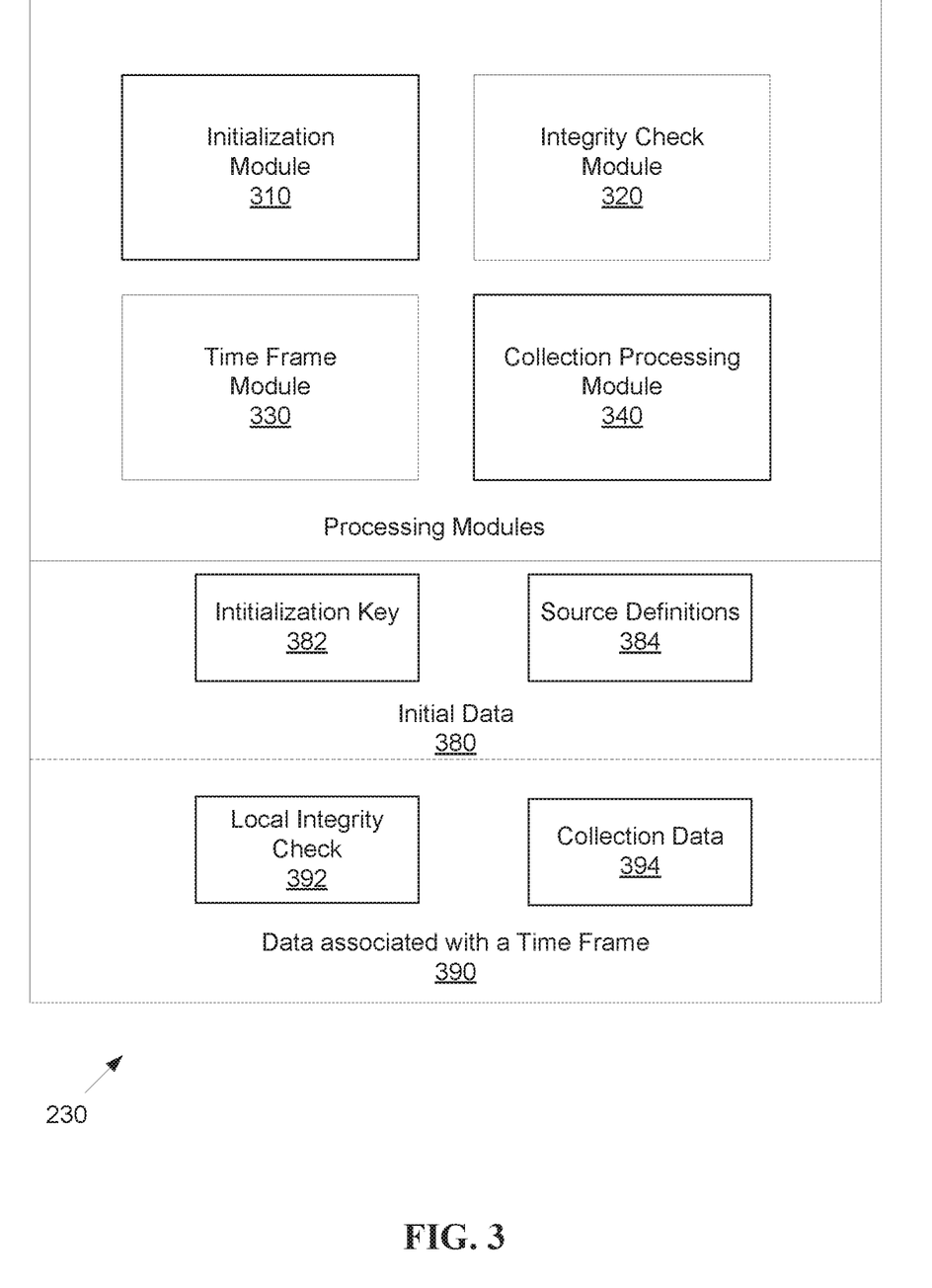
FIG. 3 is a block diagram of a first exemplary embodiment of an agent shown in FIG. 2.

FIG. 3 is a block diagram of an exemplary first embodiment of an agent 230, for example, an agent 230A, 230B, 230C shown in FIG. 2. Broadly, the agent 230 includes processing modules and data, where the data may be further categorized as initial data 380 and data associated with a time frame 390. Under the first embodiment the agent 230 includes an initialization module 310 that may define an initialization key 382, and a set of source definitions 384 that define the data for sources to be monitored/collected for the RTA 210A, 210B, 210C (FIG. 2). Over time, new sources may be added to the source definitions 384 or removed from the source definitions 384, as an integrity check module 320 is adapted to calculate a local integrity check 392 and the source definitions 384 are adapted to sources that are added to or removed from the RTA 210A, 210B, 210C (FIG. 2). The collector 250 (FIG. 2) may be informed contemporaneously as the sources definitions 384 are changed.

A time frame module 330 defines the duration(s) of time frames during which information is collected from the RTA 210A, 210B, 210C (FIG. 2). A collection processing module 340 manages changes of information in the RTA 210A, 210B, 210C (FIG. 2) during the present time frame, for example, data that was added, removed, and/or changed during the present time frame. A record of the changes is stored as collection data 394. During the time frame, for example, at the end of each time frame, the integrity check module 320 calculates the local integrity check 392 for the presently ending time frame based on the changed information identified by the collection processing module 340.

Figure 4:
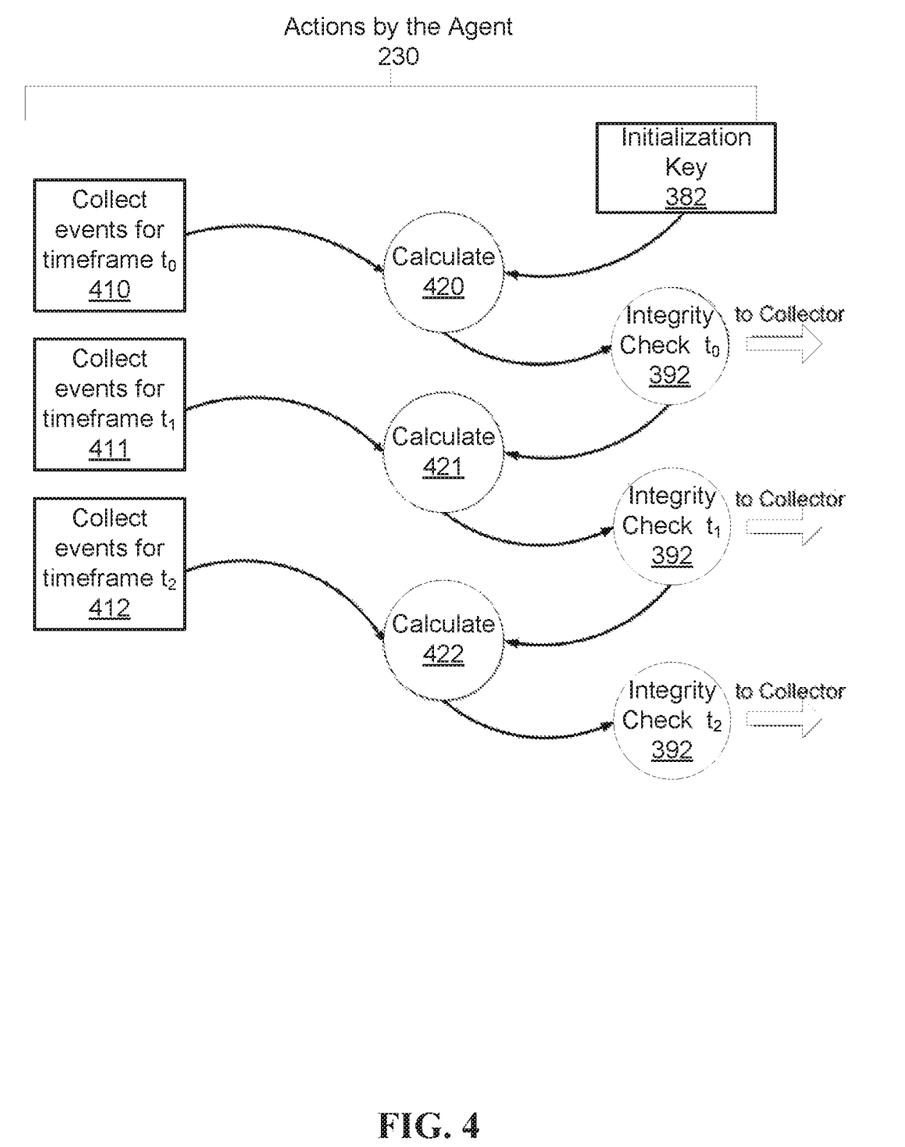
FIG. 4 is a functional diagram indicating the actions by the agent shown in FIG. 3.

FIG. 4 is a flow diagram of the actions performed by the agent 230 over the span of three time frames $t_0$, $t_1$, and $t_2$. The agent 230 collects a first set of collection data 394 (FIG. 3) collected, for example, by the collection processing module 340, during the first time frame $t_0$, as shown by block 410. The integrity check module 320 (FIG. 3) uses the first set of collection data 394 (FIG. 3) and the initialization key 382 to calculate (block 420) the local integrity check 392 for the first time frame $t_0$. The set of collection data 394 (FIG. 3) may be, for example, a list of all the events from all the configured sources belonging to the same time frame. The initialization key 382 (FIG. 3) may be implemented like a master password or a secure passphrase that is used to initialize the system for both the agent 230 and the collector 250, and then may be discarded after its initial use.

The agent 230 forwards the local integrity check 392 for the first time frame $t_0$ to the collector 250 (FIG. 2). The communication channel preferably enforces the integrity of the information sent between the agent 230 and the collector 250 (FIG. 2), for example, using some known secure protocol, such as transport layer security (TLS) or internet protocol security (IPSEC). As shown by block 411, for the second time frame $t_1$ the integrity check module 320 (FIG. 3) uses a second set of collection data 394 (FIG. 3) and the local integrity check 392 of the previous time frame, $t_0$ in this case, to calculate (block 421) the local integrity check 392 for the second-time frame $t_1$.

It should be noted that the local integrity check 392 for the previous time frame may be used to calculate the local integrity check 392 for the current time frame, except for the first time frame $t_0$, where the initialization key 382 is used to calculate the local integrity check 392 for the first time frame $t_0$ in lieu of a previous integrity check 392. So, as shown by block 412, for the third-time frame $t_2$, a third set of collection data 394 (FIG. 3) and the local integrity check 392 of the previous time frame, $t_1$ in this case, are used to calculate (block 422) the local integrity check 392 for the third-time frame $t_2$. This continues for a fourth-time frame (not shown), and all subsequent time frames (not shown).

Returning to FIG. 2, the collector 250 may be configured to be a secure protector of received information stored therein, for example, within an internal memory 260. Information 240A, 240B, 240C may be transmitted from the agent 230 to the collector 250 via secure means, for example, using encrypted data, and/or transmitted via a secure channel, for example, a virtual private network (VPN), or by other secure means. The collector 250 may be a logical entity that may be hosted on a single physical entity, or may be distributed across two or more physical entities in communication with one another. While FIG. 2 shows three RTAs 210A, 210B, and 210C for purposes of clarity, alternative embodiments may have one, two, four, or more RTAs in communication with the collector 250.

Figure 6:
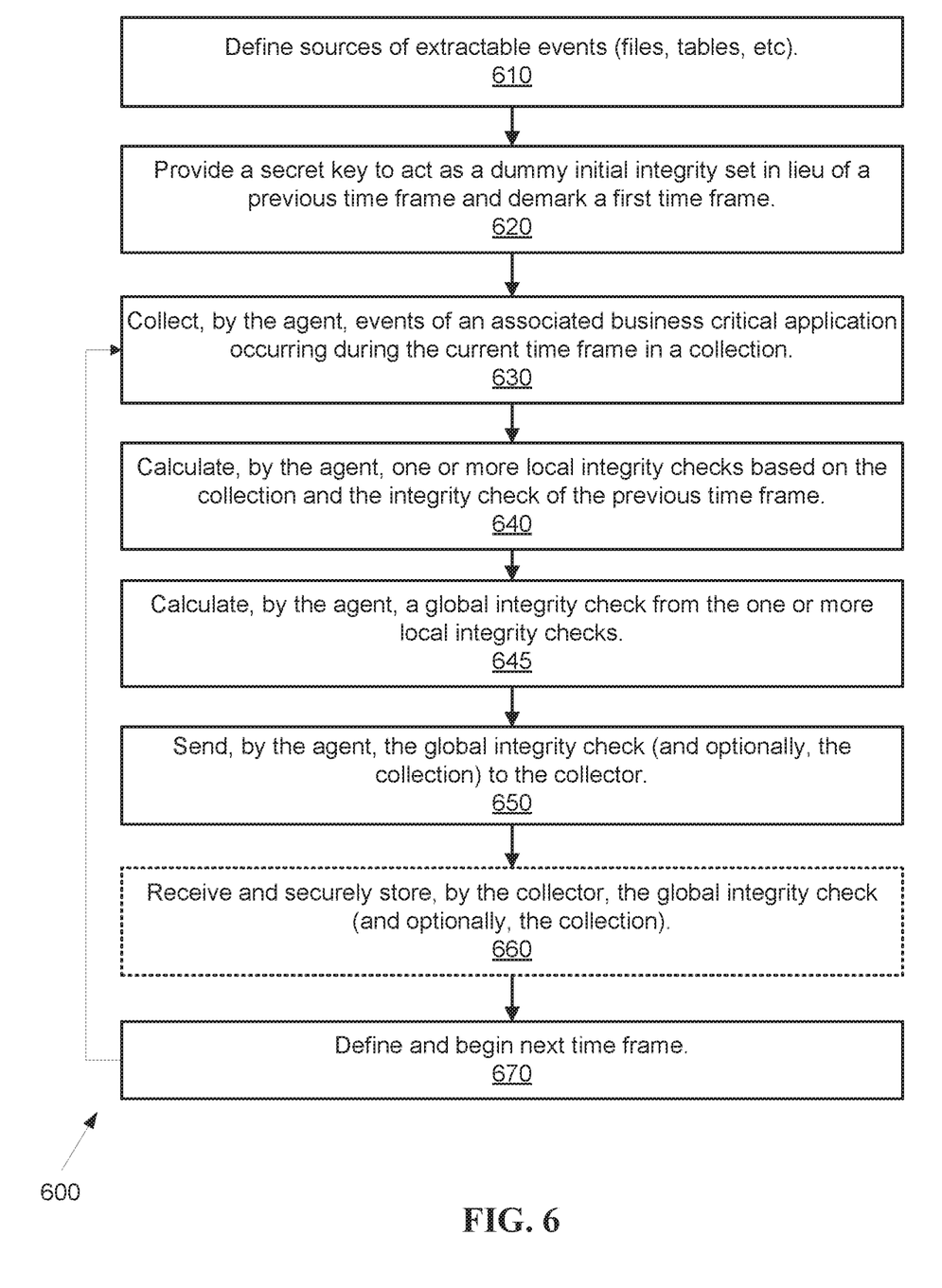
FIG. 6 is a flowchart of an exemplary method for acquiring evidence from a business-critical application in a repeatable and reproducible manner.

FIG. 6 is a flowchart of an exemplary method 600 for acquiring evidence from a business-critical application. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. The method 600 is described in reference to FIG. 2.

Sources of extractable events are defined, as shown by block 610. For example, sources may include security audit logs, requests logs, change logs, access logs, and system events, among others. A secret initialization key or keys 382 (FIG. 2) may be provided to act as a dummy initial integrity set in lieu of a previous time frame, and demark a first time frame, as shown by block 620. The secret initialization key or keys 382 (FIG. 2), may be, for example, a character string, such as a combination of letters, numerals, and symbols used in a strong text password. The agent 230A, 230B, 230C collects events of the RTA 210A, 210B, 210C occurring during the time frame in a collection 394 (FIG. 3), as shown by block 630. The collection 394 (FIG. 3) may include an ordered list of entries containing, for example, a source identifier, the even data, a time stamp, arranged in order by time stamp indicating the time of occurrence of the event.

The agent 230A, 230B, 230C calculates one or more local integrity checks 392 (FIG. 2) based on the collection 394 (FIG. 3) and the local integrity check 392 (FIG. 2) of previous time frames, as shown by block 640. The local integrity check 392 (FIG. 2) may be, for example, a hash or sumcheck calculated by using an algorithm capable of chaining the different events of the collection 394 (FIG. 3) into one single hash in order to avoid data corruption within the collection 394 (FIG. 3), for instance, the algorithm may be based on, for example, but not limited to PEO or VCR, as these algorithms ensure consecutive events in the collection will be identified by a unique integrity check.

The agent 230A, 230B, 230C calculates a global integrity check 992 (FIG. 9) based on the local integrity checks 392 (FIG. 2) of previous time frames, as shown by block 645. The global integrity check 992 (FIG. 9) (and optionally, the entire collection) is sent by the agent to the collector 250, as shown by block 650. The collector 250 receives and stores the global integrity check 992 (FIG. 9) (and optionally, the collection 394 (FIG. 3)), as shown by block 660. The next time frame is defined and begun, as shown by block 670, and the process loops back to block 630 to process the newly defined time frame.

As described further below, all the extracted events from all the different sources at a specific time have a unique global integrity check 992 (FIG. 9) associated. At any other time or place, the same events from the same sources (regardless if the RTA modified the sources after the time frame) may be obtained again and a new global integrity check 992 (FIG. 9) may be obtained using the secret initialization key. Following the same technique and procedure, both the initially calculated global integrity check R and the validating global integrity check R' are equal (see FIG. 10). The global integrity check 992 (FIG. 9) may be compromised or leaked and the integrity system is not affected as the global integrity check sent to the collector 250 is not the one used to perform the calculations, only the local integrity checks 392 are used for further calculations.

FIGS. 7-10 illustrate an exemplary embodiment for calculating and validating the local integrity check 392 and a global integrity check 992. Two initialization keys ($IV_0$, $IV_1$) may be set, for example, by a system administrator, for each of one or more agents 230, and in a trusted server, namely, the collector 250 in a communication network with the one or more agents 230.

During each time frame, the agent 230 accumulates all events from a defined set of sources defined in the source definitions 384 into a collection 394. The collection 394 is then unified into a unique local integrity check 392 (hash value) using a specific initialization key IV 382. Collections 394 may be taken in pairs, meaning two consecutive hashes may have the same initialization key IV 382. The following steps describe this process.

Figure 7:
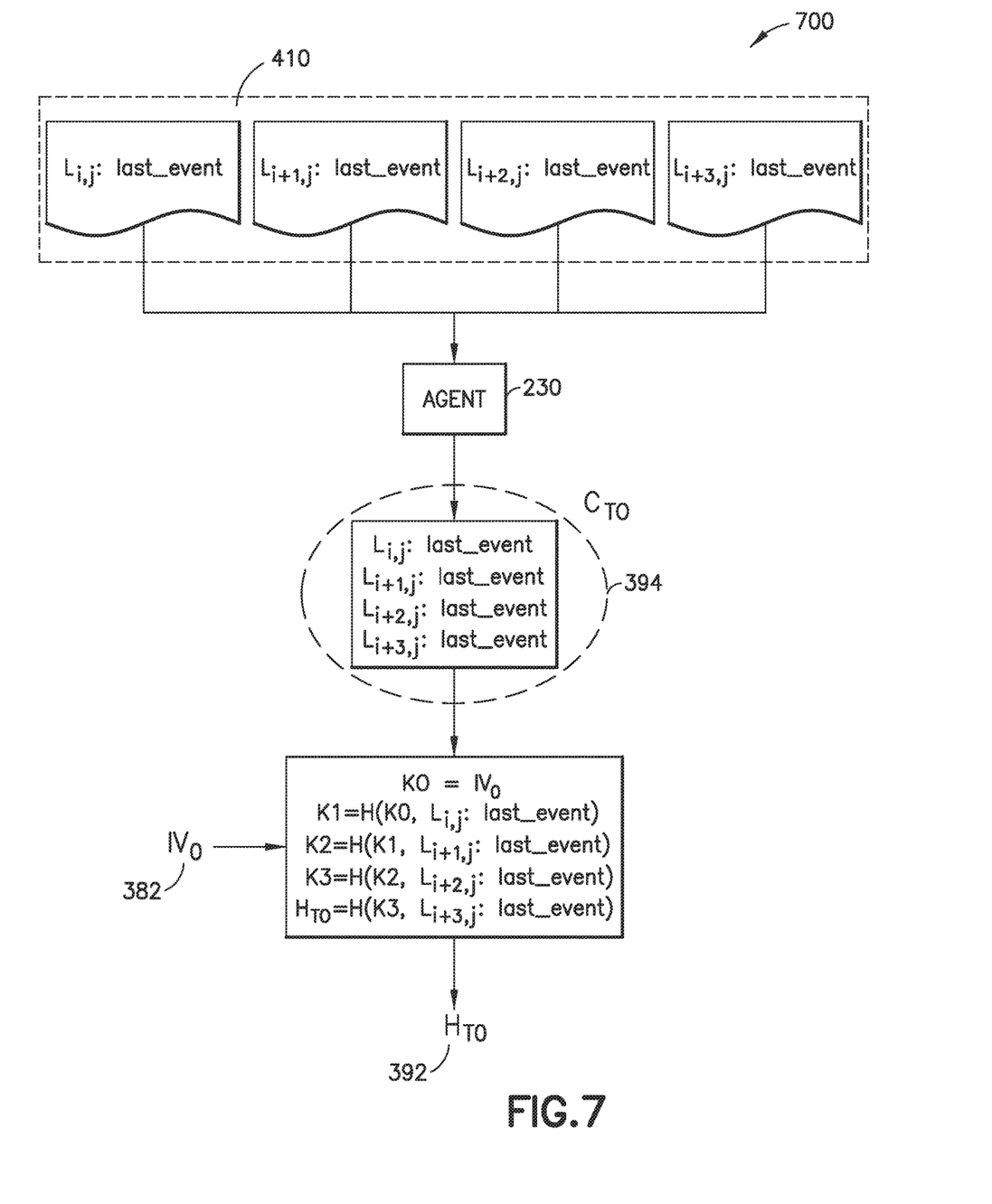
FIG. 7 is a functional diagram for calculating and verifying the initial integrity check.
Figure 8:
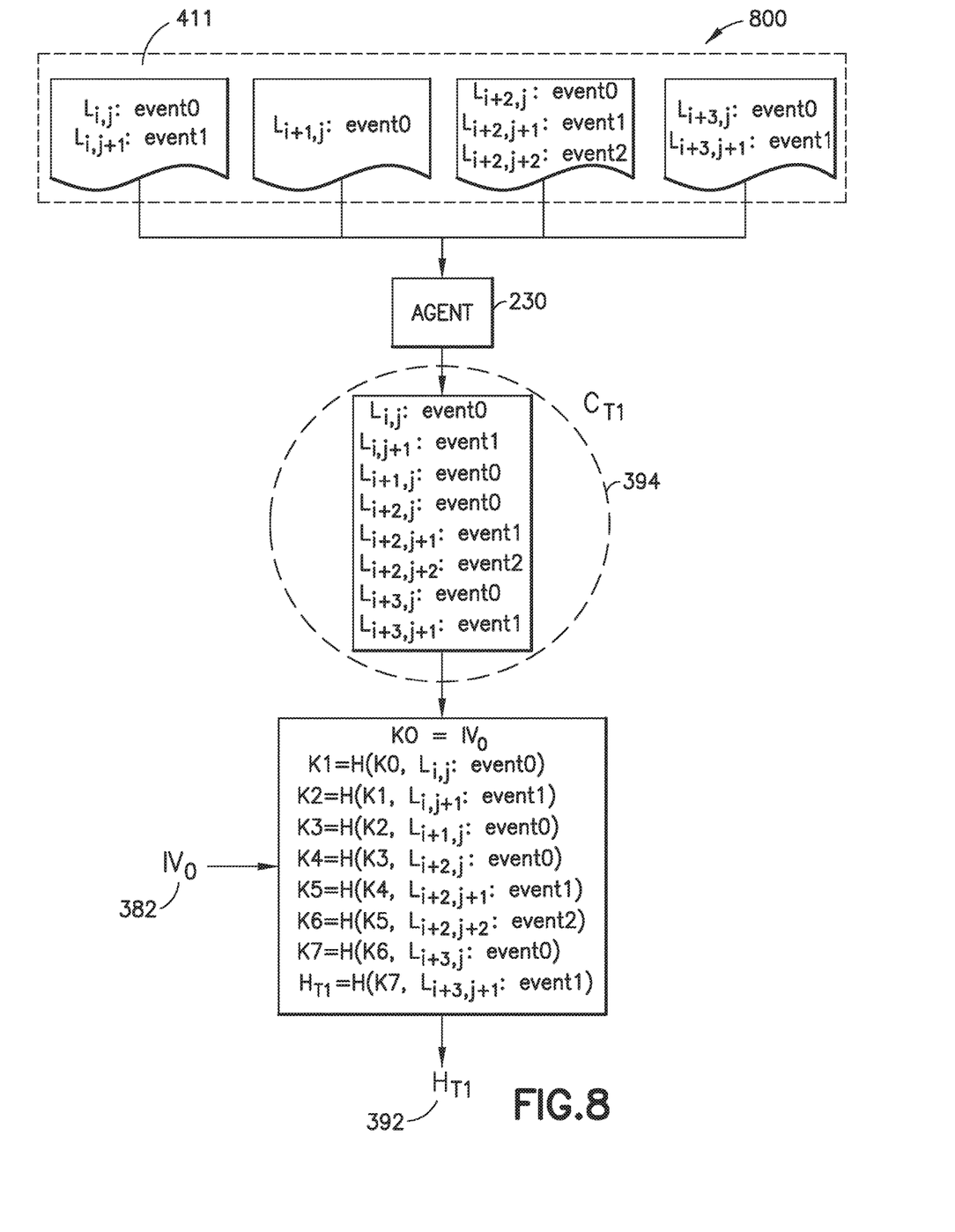
FIG. 8 is a functional diagram for calculating and verifying the integrity check for a first time frame.

For the first two collections of events, the agent 230 accumulates all the events from all sources within the last existing time frame (i−1) and generates a corresponding hash (local integrity check 392) using the first initialization key IV 382. The same process is performed for the initial time frame (i). Both hashes are unified, for example, using an exclusive or (XOR) operation, into one hash ($H_{0,1}$). For the second two collections of events, the agent 230 accumulates all the events from all sources within the following time frame (i+1) and generates the corresponding hash or local integrity check (using the second initialization key IV 382). The same process is performed for the next time frame (i+2). Both hashes are unified (for example, using an XOR operation) into one hash ($H_{2,3}$).

Figure 9:
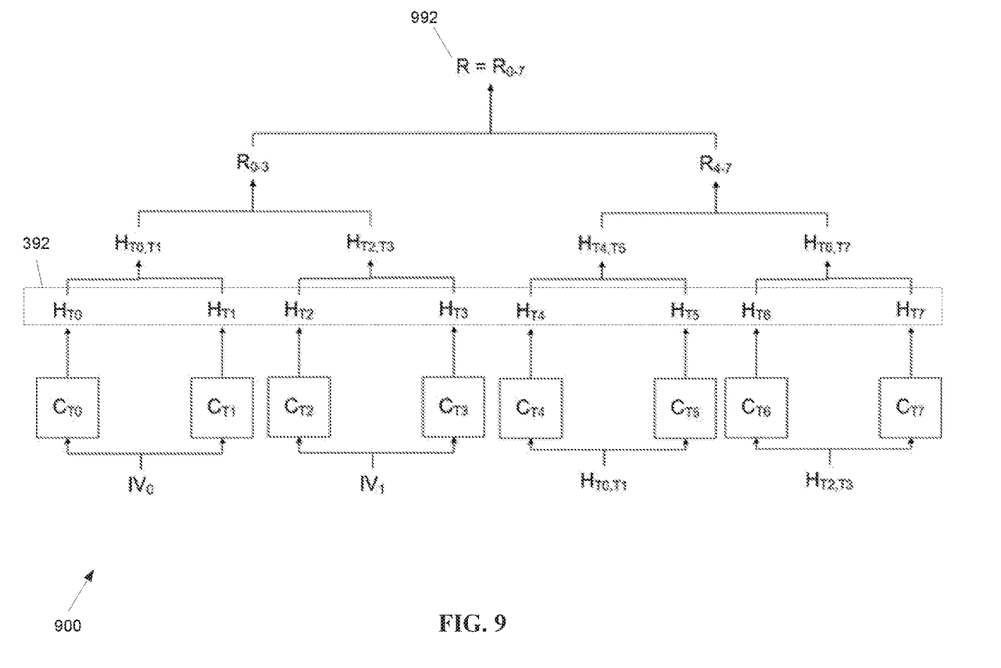
FIG. 9 is a functional diagram illustrating an exemplary binary tree for calculating and verifying a global integrity check.

For all succeeding pairs, signified as the Nth two collections, the agent 230 accumulates all the events from all sources within the Nth time frame and generates the corresponding local integrity check using the initialization key IV 382 as the last generated hash ($H_{n-1,n-2}$). The same process may be performed for the next time frame. The last two hashes are unified (for example, XOR operation) into one hash ($H_{n,n+1}$).

Figure 10:
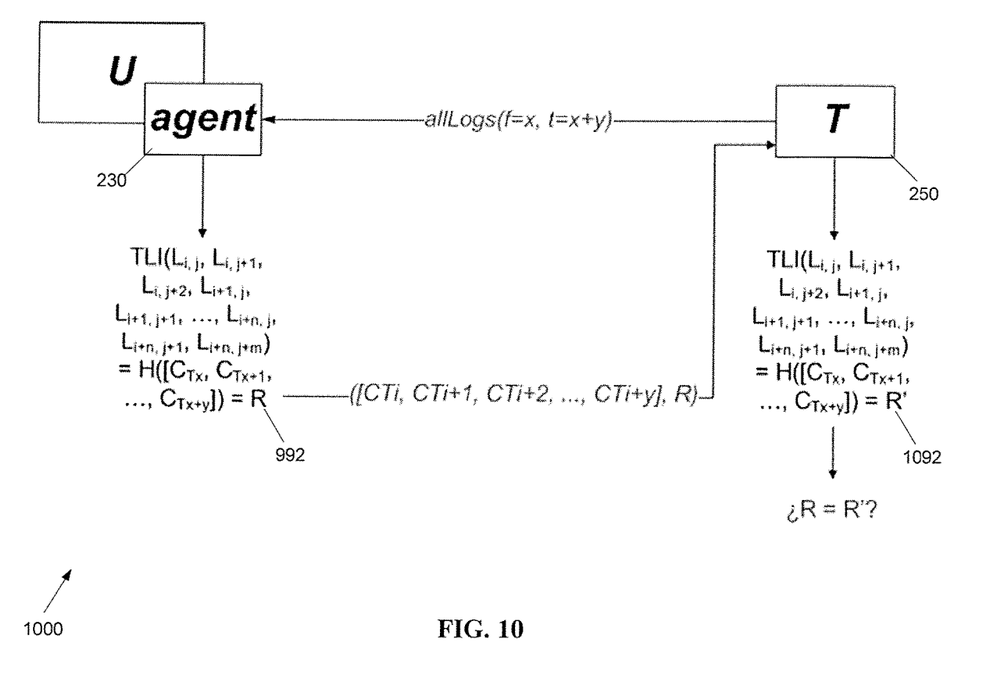
FIG. 10 is a functional diagram illustrating the data flow for calculating and verifying the global integrity check.

The collector 250 receives data regarding all the events within each time frame from the agents 230. Each agent 230 collects all the logs within each time frame, where each agent 230 unifies all the generated local integrity checks (XOR operation), for example, using a binary-tree, into a unique resulting global integrity check 992 (R) and sends it to the collector 250. The collector 250 performs the same calculations and operations on all the received events and generates a new resulting global integrity check 1092 (R'). If R 992 and R' 1092 are equal, then all the events within that specific period of time are determined to be integral (not corrupted) and can be trusted.

As shown in FIG. 7, an agent 230 collects logs for events 410 corresponding to the last existing time frame from all the sources defined in the source definitions 384. The set of all the logs is the Collection $C_{T0}$, which then is unified into a unique local integrity check $H_{T0}$ (392) using the first initialization key 392 $IV_0$. As shown in FIG. 8, the agent 230 collects the logs corresponding to the first time frame 411 from all the sources. The set of all the logs is the Collection $C_{T1}$, which then is unified into a unique local integrity check $H_{T1}$ (392) using the first initialization key 392 $IV_0$.

As shown by FIG. 9, all local integrity checks 392 from all events belonging to a time frame are unified into a unique global integrity check 992 in a binary-tree way which is sent from the agent 230 to the collector 250. For example, this global integrity check 992 may be generated using a Merkle tree, although a person having ordinary skill in the art will recognize that the global hash may be generated with a different algorithm. As shown in FIG. 10, U is an untrusted node/server, for example, a RTA, where the logs reside. U has an agent 230 which actually implements the first side of the integrity check system (see FIGS. 7, 8). T is the trusted server (the collector 250) which receives all the log events and the global integrity check R (992) from the agent 230. T implements a second side of the integrity check system, re-calculating the integrity check R' (1092) and verifying the integrity of the events in a given period of time by confirming that the recalculated integrity check R' (1092) check matches the received global integrity check R (992), thereby providing evidence of chain of custody.

Figure 5:
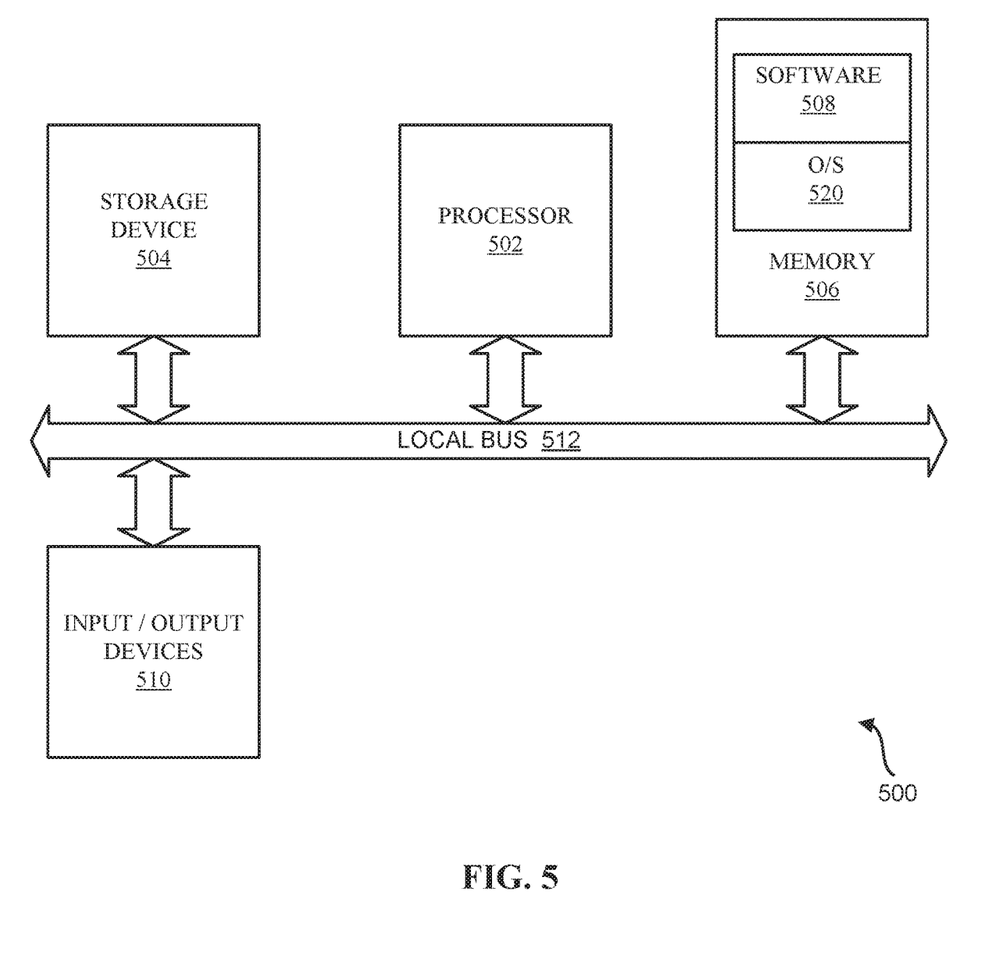
FIG. 5 is a schematic diagram illustrating an exemplary system architecture for executing functionality of the present invention.

As previously mentioned, the present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The above described embodiments provide for real-time extraction of data from RTAs so that the data acquisition accuracy may be verified, for example, so as to be admissible as electronic evidence Systems employing RTAs typically have 24×7×365 availability requirements and their sources of information need to be extracted in a way that ensures the feasibility of a proper Chain of Custody. The embodiments work with those systems, and an agent may be deployed in every single system, sending the events to the collector. In particular, the embodiments provide for extraction of evidence that is repeatable and reproducible. The above described embodiments provide for recovery of valid evidence in near real time due to the proactive approach. The embodiments allow access to the information previously available before an incident occurs, which may significantly assist first responders.

In many applications, the ability to produce verifiable data is essential to the functionality of an RTA. Therefore, the claims represent an improvement in the functionality of the systems and devices executing the RTAs themselves by providing data verification over multiple time periods, and also represent an improvement to fields such as, but not limited to system forensics analysis.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for acquiring time limited data to facilitate integrity verification in real-time applications (RTAs), comprising:
    an agent associated with a RTA in communication with a collector, the agent comprising a processor and a memory configured to store non-transitory instructions which when executed by the processor perform the steps of:
        defining a plurality of time ordered time frames, wherein each time frame of the plurality of time ordered time frames comprises a time duration;
        retrieving a collection comprising an event signifying a change in state of data of the RTA during the time duration for each time frame of the plurality of time frames;
        calculating, at a first time corresponding to a first time frame from the plurality of time ordered time frames, a first local integrity check from the collection and an initialization key;
        retrieving additional collections for subsequent time frames from the plurality of time ordered time frames that are after the first time frame, wherein each of the additional collections comprises an event signifying a change in state of data of the RTA during each of the subsequent time frames;
        calculating subsequent local integrity checks for each of the additional collections based on a prior local integrity check corresponding to a prior time frame;
        calculating a global integrity check, after the prior time frame for each of the calculated subsequent local integrity checks, from a combination of the first local integrity check and the subsequent local integrity checks; and
    the collector comprising a storage, a processor, and a memory configured to store non-transitory instructions which when executed by the processor perform the steps of:
        receiving the global integrity check and the collections from the agent;
        storing the received global integrity check in the storage; and
        calculating, based on the global integrity check and the collections, a validating global integrity check to verify integrity of the global integrity check.

2. The system of claim 1, wherein the agent further executes the step of transmitting the collections and the global integrity check to the collector.

3. The system of claim 1, wherein each of the local integrity checks for the corresponding time frame comprises a hash calculation comprising one or more of the events in the time frame and the initialization key or a key based on a prior local integrity check.

4. The system of claim 3, the key comprises a combination of the local integrity check of two or more preceding collections.

5. The system of claim 1, wherein calculating the local integrity check further comprises calculating a checksum of the collections.

6. The system of claim 1, wherein the agent and collector are in communication via a data network.

7. The system of claim 1, wherein the data network is configured to ensure data integrity.

8. The system of claim 1, wherein the collector further executes the step of verifying the validity of the global integrity check.

9. The system of claim 1, wherein the collector is further configured to perform the step of receiving the collection from the agent.

10. The system of claim 1, wherein the real-time application comprises a business-critical application.

11. A method executed by a computer processor for acquiring time limited data from a Real-Time Application (RTA) for integrity verification comprising the steps of:
    defining a time frame of a plurality of time ordered time frames, wherein each time frame of the plurality of time ordered time frames comprises a time duration;
    retrieving one or more collections, with each collection comprising an event signifying a change in state of data of the RTA during the time duration for each of a corresponding one of the time frames;

calculating one or more local integrity checks for each of the one or more collections at the corresponding one of the time frame, wherein the calculating comprises calculating a first local integrity check based on a first collection at a first time frame and an initialization key;

retrieving additional collections from the one or more collections for subsequent time frames from the plurality of time ordered time frames that are after the first time frame, wherein each of the additional collections comprises an event signifying a change in state of data of the RTA during each of the subsequent time frames;

calculating a subsequent local integrity check for a subsequent time frame based on one of the additional collections from that subsequent time frame and based on at least one preceding local integrity check corresponding to a prior time frame;

receiving, at the subsequent time frame, a selection of the subsequent time frame;

calculating a global integrity check at the subsequent time frame after the prior time frame for each of the calculated subsequent local integrity checks from a combination of each of the one or more local integrity checks that were calculated prior to the subsequent time frame; and providing the global integrity check and the one or more collections to a collector, wherein the collector is configured to store the received global integrity check and the one or more collections, and the collector is further configured to calculate, based on the global integrity check and the one or more collections, a validating global integrity check to verify integrity of the global integrity check.

12. The method of claim 11, wherein a key for each of the subsequent time frames each comprise a combination of the local integrity checks of two or more preceding collections.

13. The method of claim 11, wherein calculating the one or more local integrity checks further comprises calculating a checksum of the one or more collections.

14. The method of claim 11, wherein the global integrity check comprises a checksum from a combination of one or more local integrity checks.

15. The method of claim 11, wherein the real-time application comprises a business-critical application.

16. A non-transitory computer-readable medium configured to store non-transitory instructions for execution by a processor, the instructions defining modules for acquiring time limited data to facilitate integrity verification in real-time applications (RTAs) comprising:

an initialization module configured to provide an initialization key;

a time frame module configured to define a plurality of time ordered time frames including a first time frame and a second time frame, wherein each time frame comprises a time duration;

a collection processing module configured for:
retrieving a first collection comprising one or more events signifying a change in state of data of the RTA occurring during the time duration of the first time frame; and retrieving a second collection comprising one or more events signifying a change in state of data of the RTA occurring during the time duration of the second time frame; and an integrity check module configured for:

calculating a first integrity check corresponding to the first time frame from the initialization key and the first collection;

calculating a second integrity check corresponding to the second time frame from the first integrity check and the second collection;

calculating a global integrity check during the second time frame, which is after a prior time frame for the first local integrity check, and is based on a combination of the first integrity check and the second integrity check;

providing, to a collector, the global integrity check; and providing, to the collector, the first and second collections so that the collector performs a calculation of a validating global integrity check to verify integrity of the global integrity check, wherein the calculation of the validating global integrity check is based on the global integrity check and the collections.

17. The non-transitory computer-readable medium of claim 16 wherein the initialization module is further configured to define a source definition comprising a source in the RTA of one or more events.

18. The non-transitory computer-readable medium of claim 17 wherein changes to the source definition are further provided when the changes occur.

19. A device for acquiring reproducible time limited data to facilitate integrity verification in real-time applications (RTAs), comprising a processor and a memory configured to store non-transient instructions which when executed by the processor perform the steps of:

defining a first time frame of a plurality of time ordered time frames, wherein each time frame of the plurality of time ordered time frames comprises a time duration;

retrieving a first collection from a plurality of collections comprising an event signifying a change in state of data of the RTA during the time duration for the first time frame; and calculating, at a first time corresponding to a first time frame from the plurality of time ordered time frames, a first local integrity check from the first collection and an initialization key;

retrieving additional collections of the plurality of collections that each correspond to individual ones of subsequent time frames from the plurality of time ordered time frames, wherein each of the subsequent time frames is after the first time frame and each of the additional collections comprises an event signifying a change in state of data of the RTA during the time duration for a corresponding one of the subsequent time frames;

calculating subsequent local integrity checks for each of the subsequent time frames based on a corresponding one of the additional collections and based on a prior local integrity check corresponding to a prior time frame; and calculating a global integrity check, after the prior time frame for each of the calculated subsequent local integrity checks, at one of the subsequent time frames based on a combination of the calculated local integrity checks preceding the subsequent time frames; and providing the global integrity check and the retrieved collections to a collector, wherein the collector is configured to store the received global integrity check and the retrieved collections, and the collector is further configured to calculate, based on a combination of the global integrity check and the retrieved collections, a validating global integrity check to verify integrity of the global integrity check.

20. The device of claim 19, wherein each of the local integrity checks for the corresponding time frame comprises a hash calculation comprising one or more of the events in the time frame and the initialization key or a key based on a prior local integrity check.

21. The device of claim 20, the key comprises a combination of the local integrity check of two or more preceding collections.

22. The device of claim 19, wherein calculating the local integrity check further comprises calculating a checksum of the retrieved collections.

23. The device of claim 19 wherein the global integrity check comprises reproducible time limited evidence.

24. The device of claim 19, wherein the real-time application comprises a business-critical application.

* * * * *